US012619717B2

(12) United States Patent
Wüest et al.

(10) Patent No.: US 12,619,717 B2
(45) Date of Patent: May 5, 2026

(54) SYSTEMS AND METHODS FOR DETECTING MALICIOUS ACTIVITY USING A MACHINE LEARNING MODEL TUNED TO A SPECIFIC ENDPOINT DEVICE

(71) Applicant: Acronis International GmbH, Schaffhausen (CH)

(72) Inventors: Candid Wüest, Bassersdorf (CH); Philipp Gysel, Bern (CH); Dinil Mon Divakaran, Singapore (SG); Andrey Ustyuzhanin, Singapore (SG); Kenneth Nwafor, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 241 days.

(21) Appl. No.: 18/542,699

(22) Filed: Dec. 17, 2023

(65) Prior Publication Data

US 2025/0200175 A1 Jun. 19, 2025

(51) Int. Cl.
G06F 21/55 (2013.01)
G06N 20/00 (2019.01)

(52) U.S. Cl.
CPC ........... G06F 21/554 (2013.01); G06N 20/00 (2019.01); G06F 2221/034 (2013.01)

(58) Field of Classification Search
CPC .. G06F 21/554; G06F 2221/034; G06N 20/00
(Continued)

(56) References Cited

U.S. PATENT DOCUMENTS 9,141,790 B2 9/2015 Roundy et al.
10,917,435 B2 2/2021 Stupak et al.
(Continued)

OTHER PUBLICATIONS

Yang, ProGrapher: an Anomaly Detection System based on Provenance Graph Embedding, Aug. 9, 2023, https://www.usenix.org/system/files/usenixsecurity23-yang-fan.pdf (Year: 2023).*
(Continued)

*Primary Examiner* — Zi Ye
(74) *Attorney, Agent, or Firm* — ArentFox Schiff LLP; Michael Fainberg

(57) ABSTRACT

Disclosed herein are systems and method for detecting malicious activity using a tuned machine learning model. In one aspect, a method includes receiving a plurality of logs indicative of software behavior from a plurality of endpoint devices and generating a plurality of event sequences from the plurality of logs. The method includes training a global machine learning model using the plurality of event sequences to predict resultant events for a sequence of lead up events and classify whether the resultant events indicate malicious activity. The method includes, for each respective endpoint device of the plurality of endpoint devices, generating a testing dataset comprising a plurality of benign event sequences that occurred on the respective endpoint device. The method includes generating a tuned machine learning model for the respective endpoint device by retraining the global machine learning model using the testing dataset. The method includes executing the tuned machine learning model.

19 Claims, 5 Drawing Sheets

(58) Field of Classification Search
USPC ........................................................ 726/23
See application file for complete search history.

(56) References Cited

U.S. PATENT DOCUMENTS

| | | | |
|---|---|---|---|
| 2020/0285737 A1* | 9/2020 | Kraus ................... | G06F 21/552 |
| 2020/0364338 A1 | 11/2020 | Ducau et al. | |
| 2022/0321585 A1* | 10/2022 | Cobb ........................ | G06N 3/08 |
| 2024/0386295 A1* | 11/2024 | Yu ............................ | G06N 5/04 |
| 2025/0168183 A1* | 5/2025 | Ben Ami ............ | H04L 63/1416 |

OTHER PUBLICATIONS

Alsaheel et al., "ATLAS: A Sequence-based Learning Approach for Attack Investigation," Proceedings of the 30th USENIX Security Symposium, Aug. 11-13, 2021, pp. 3005-3022.

Darktrace, "Darktrace Detect," darktrace.com, 2022, Retrieved from Internet: <https://darktrace.com/products/detect>, pp. 1-7.
Deep Instinct, "Why Deep Learning?," deepinstinct.com, 2023, Retrieved from Internet: <https://www.deepinstinct.com/why-deep-instinct>, 9 pages.
Frankel, N., "Purple AI | Empowering Cybersecurity Analysts with AI-Driven Threat Hunting, Analysis & Response," SentinelOne, Apr. 26, 2023, Retrieved from Internet: <https://www.sentinelone.com/blog.2023/04/>, 10 pages.
Krasser, S., "How Human Intelligence Is Supercharging CrowdStrike's Artificial Intelligence," Crowdstrike Blog, Apr. 8, 2022, Retrieved from Internet: <https://www.crowdstrike.com/blog/how-human-intelligence-is-supercharging-crowdstrike-artificial-intelligence/>, pp. 1-10.
Wang et al., "You Are What You Do: Hunting Stealthy Malware via Data Provenance Analysis," Network and Distributed Systems Security (NDSS) Symposiom 2020, Feb. 23-26, 2020, San Diego, CA, USA, pp. 1-17.

* cited by examiner

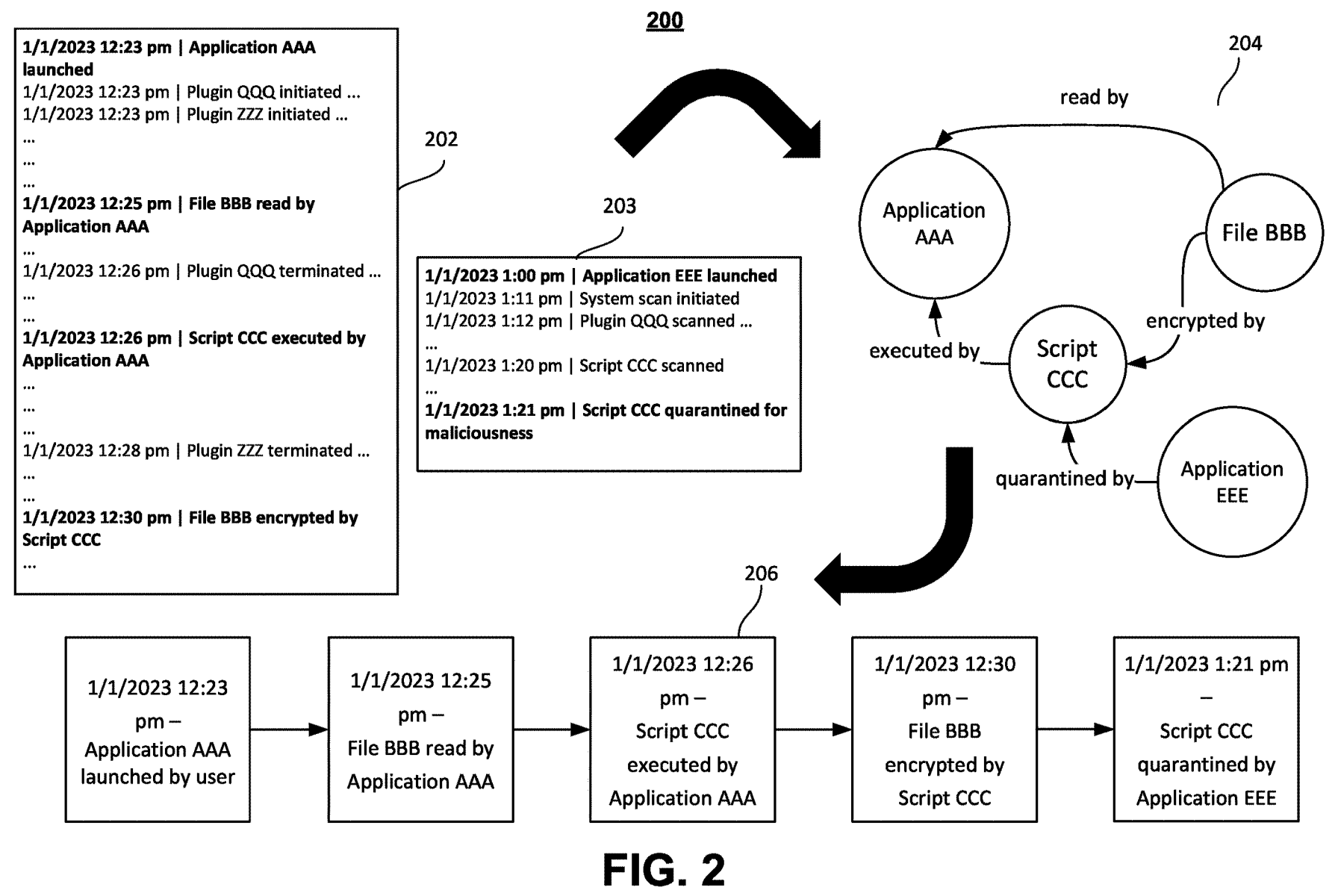

200

204

File BBB read by encrypted by

Application
AAA executed by

Script
CCC quarantined by

Application
EEE

202

1/1/2023 12:23 pm | Application AAA launched
1/1/2023 12:23 pm | Plugin QQQ initiated ...
1/1/2023 12:23 pm | Plugin ZZZ initiated ...
...
1/1/2023 12:25 pm | File BBB read by Application AAA
...
1/1/2023 12:26 pm | Plugin QQQ terminated ...
...
1/1/2023 12:26 pm | Script CCC executed by Application AAA
...
1/1/2023 12:28 pm | Plugin ZZZ terminated ...
...
1/1/2023 12:30 pm | File BBB encrypted by Script CCC
...

203

1/1/2023 1:00 pm | Application EEE launched
1/1/2023 1:11 pm | System scan initiated
1/1/2023 1:12 pm | Plugin QQQ scanned ...
...
1/1/2023 1:20 pm | Script CCC scanned
...
1/1/2023 1:21 pm | Script CCC quarantined for maliciousness

206

1/1/2023 12:23
pm –
Application AAA
launched by user

1/1/2023 12:25
pm –
File BBB read by
Application AAA

1/1/2023 12:26
pm –
Script CCC
executed by
Application AAA

1/1/2023 12:30
pm –
File BBB
encrypted by
Script CCC

1/1/2023 1:21 pm
–
Script CCC
quarantined by
Application EEE

FIG. 2

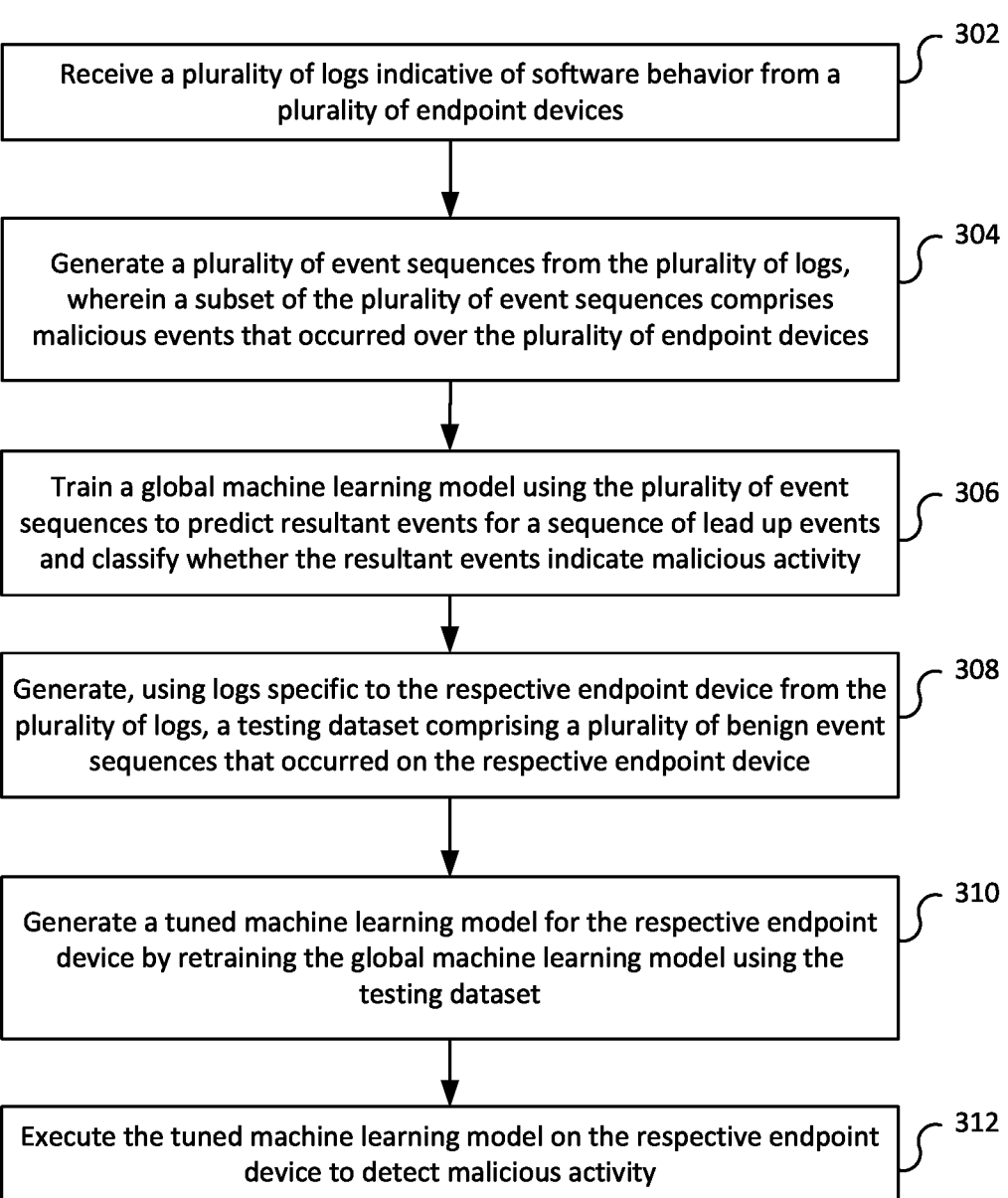

300

302 — Receive a plurality of logs indicative of software behavior from a plurality of endpoint devices 304 — Generate a plurality of event sequences from the plurality of logs, wherein a subset of the plurality of event sequences comprises malicious events that occurred over the plurality of endpoint devices 306 — Train a global machine learning model using the plurality of event sequences to predict resultant events for a sequence of lead up events and classify whether the resultant events indicate malicious activity 308 — Generate, using logs specific to the respective endpoint device from the plurality of logs, a testing dataset comprising a plurality of benign event sequences that occurred on the respective endpoint device 310 — Generate a tuned machine learning model for the respective endpoint device by retraining the global machine learning model using the testing dataset 312 — Execute the tuned machine learning model on the respective endpoint device to detect malicious activity

SYSTEMS AND METHODS FOR DETECTING MALICIOUS ACTIVITY USING A MACHINE LEARNING MODEL TUNED TO A SPECIFIC ENDPOINT DEVICE

FIELD OF TECHNOLOGY

The present disclosure relates to the field of data security, and, more specifically, to systems and methods for detecting malicious activity using a machine learning model tuned to a specific endpoint device.

BACKGROUND

Endpoint Detection and Response (EDR) and Extended Detection and Response (XDR) solutions have several limitations in regards to providing tailored protection based on specific customer needs. This is because these solutions apply one global detection model to all customers, regardless of their local uniqueness. This problem creates a need for a more versatile and customizable detection system capable of continuously analyzing, learning, and adapting to the unique features of individual customer networks while keeping the data of the client within its network perimeter in order to provide more accurate, private, and efficient malware identification and mitigation.

SUMMARY

In one exemplary aspect, the techniques described herein relate to a method for detecting malicious activity using a tuned machine learning model, the method including: receiving a plurality of logs indicative of software behavior from a plurality of endpoint devices; generating a plurality of event sequences from the plurality of logs, wherein a subset of the plurality of event sequences includes malicious events that occurred over the plurality of endpoint devices; training a global machine learning model using the plurality of event sequences to predict resultant events for a sequence of lead up events and classify whether the resultant events indicate malicious activity; and for each respective endpoint device of the plurality of endpoint devices: generating, using logs specific to the respective endpoint device from the plurality of logs, a testing dataset including a plurality of benign event sequences that occurred on the respective endpoint device; generating a tuned machine learning model for the respective endpoint device by retraining the global machine learning model using the testing dataset; and executing the tuned machine learning model on the respective endpoint device to detect malicious activity.

In some aspects, the techniques described herein relate to a method, wherein retraining the global machine learning model includes: determining that a benign event sequence of the plurality of benign event sequences is incorrectly classified by the global machine learning model as indicative of malicious activity; and adjusting parameters of the global machine learning model such that the benign event sequence is correctly classified by the global machine learning model as indicative of benign activity, wherein the tuned machine learning model is the global machine learning model with adjusted parameters.

In some aspects, the techniques described herein relate to a method, wherein generating the testing dataset includes including, in the testing dataset, a plurality of malicious event sequences originating from the plurality of endpoint devices aside from the respective endpoint device.

In some aspects, the techniques described herein relate to a method, wherein generating the testing dataset includes applying a boosting algorithm on one or both of the plurality of benign event sequences and the plurality of malicious event sequences.

In some aspects, the techniques described herein relate to a method, wherein each benign event sequence of the plurality of benign event sequences includes at least one object not found in the plurality of endpoint devices aside from the respective endpoint device.

In some aspects, the techniques described herein relate to a method, further including detecting the malicious activity by applying the tuned machine learning model on an input sequence of events of the respective endpoint device.

In some aspects, the techniques described herein relate to a method, wherein a first tuned machine learning model for a first endpoint device of the plurality of endpoint devices has different parameters than a second tuned machine learning model for a second endpoint device of the plurality of endpoint devices.

In some aspects, the techniques described herein relate to a method, wherein generating the plurality of event sequences includes: generating, based on the plurality of logs, a plurality of provenance graphs that each represent relationships between different types of data objects on an endpoint device by linking a plurality of data objects by a plurality of actions; detecting a plurality of trigger actions in the plurality of provenance graphs; and generating, for each respective trigger action of the plurality of trigger actions, an event sequence that contributed to an occurrence of the respective trigger action.

In some aspects, the techniques described herein relate to a method, wherein each respective sequence of the plurality of event sequences includes a first plurality of lead up events and a second plurality of resultant events, and wherein training the global machine learning model includes: masking, for each respective sequence of the plurality of event sequences, the second plurality of resultant events; and adjusting parameters of the global machine learning model to output the second plurality of resultant events for an input including the first plurality of lead up events.

In some aspects, the techniques described herein relate to a method, wherein generating a respective provenance graph of the plurality of provenance graphs includes: identifying, in a first log, a source object, an action performed by the source object, and a target object on which the action was performed; and linking, on the respective provenance graph, a first identifier of the source object, a second identifier of the action, and a third identifier of the target object.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting malicious activity using a tuned machine learning model, including: at least one memory; at least one hardware processor coupled with the at least one memory and configured, individually or in combination, to: receive a plurality of logs indicative of software behavior from a plurality of endpoint devices; generate a plurality of event sequences from the plurality of logs, wherein a subset of the plurality of event sequences includes malicious events that occurred over the plurality of endpoint devices; train a global machine learning model using the plurality of event sequences to predict resultant events for a sequence of lead up events and classify whether the resultant events indicate malicious activity; and for each respective endpoint device of the plurality of endpoint devices: generate, using logs specific to the respective endpoint device from the plurality of logs, a testing dataset including a plurality of benign event sequences that occurred on the respective endpoint device; generate a tuned machine learning model for the respective endpoint device by retraining the global machine learning model using the testing dataset; and execute the tuned machine learning model on the respective endpoint device to detect malicious activity.

In some aspects, the techniques described herein relate to a non-transitory computer readable medium storing thereon computer executable instructions for detecting malicious activity using a tuned machine learning model, including instructions for: receiving a plurality of logs indicative of software behavior from a plurality of endpoint devices; generating a plurality of event sequences from the plurality of logs, wherein a subset of the plurality of event sequences includes malicious events that occurred over the plurality of endpoint devices; training a global machine learning model using the plurality of event sequences to predict resultant events for a sequence of lead up events and classify whether the resultant events indicate malicious activity; and for each respective endpoint device of the plurality of endpoint devices: generating, using logs specific to the respective endpoint device from the plurality of logs, a testing dataset including a plurality of benign event sequences that occurred on the respective endpoint device; generating a tuned machine learning model for the respective endpoint device by retraining the global machine learning model using the testing dataset; and executing the tuned machine learning model on the respective endpoint device to detect malicious activity.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a block diagram illustrating a generation of event sequences.

FIG. 3 illustrates a flow diagram of a method for detecting malicious activity using a machine learning model tuned to a specific endpoint device.

DETAILED DESCRIPTION

Exemplary aspects are described herein in the context of a system, method, and computer program product for detecting malicious activity using a machine learning model tuned to a specific endpoint device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The systems and methods of the present disclosure overcome the shortcomings of conventional solutions by learning from multiple customer groups (e.g., networks) and developing a fine-tuned model for each customer-taking into account the local specificities—and thereby learning in a collaborative way for better protection. Conventional systems simply lack the adaptability to account for the unique characteristics of each customer's network, such as identifying which applications are common in the local environment and which processes run frequently, resulting in less effective malware detection and response.

Figure 1:
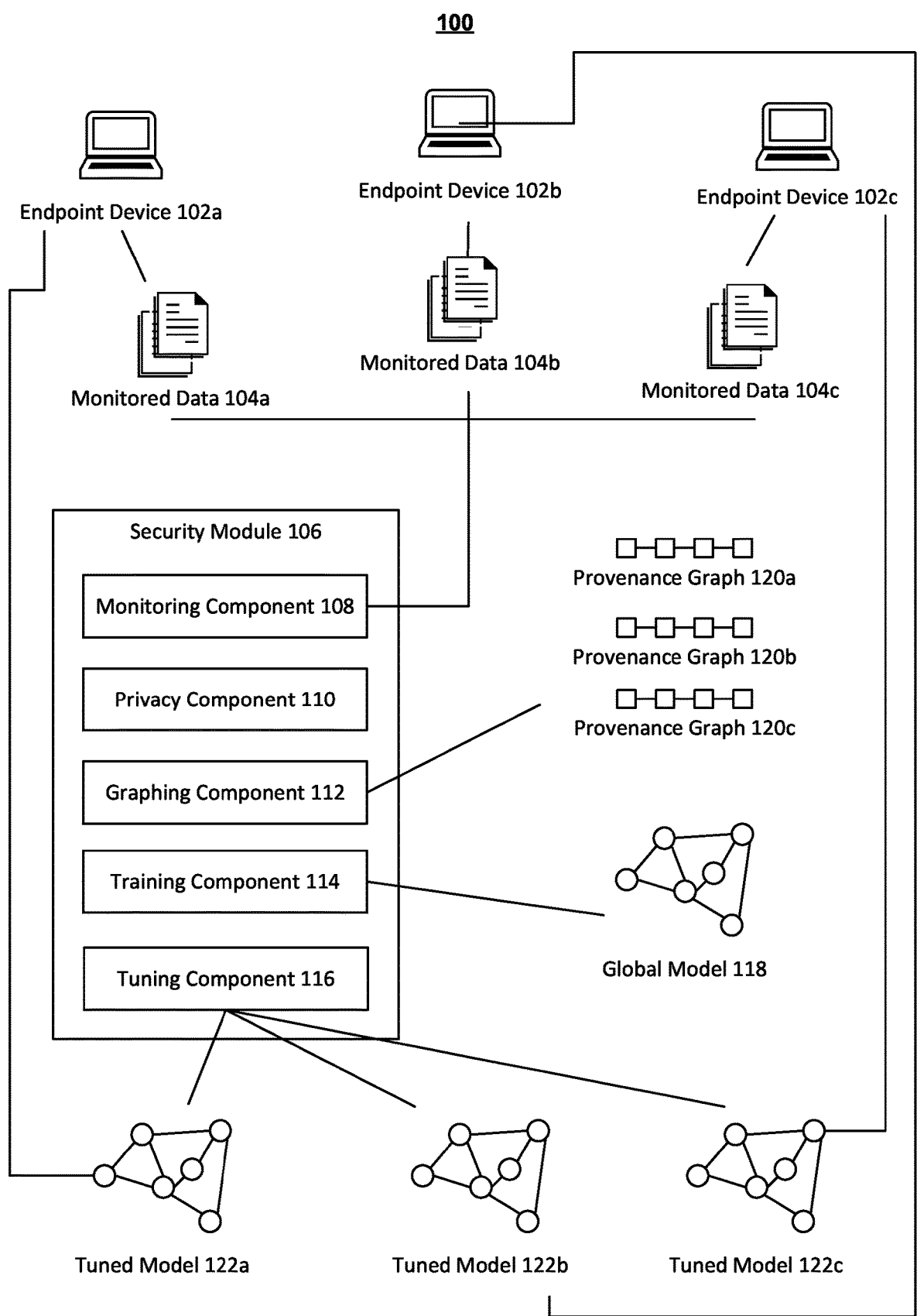
FIG. 1 is a block diagram illustrating a system for detecting malicious activity using a machine learning model tuned to a specific endpoint device.

FIG. 1 is a block diagram illustrating system 100 for detecting malicious activity with a tuned model on an endpoint device. System 100 includes security module 106, which may be software part of an endpoint detection and response (EDR) system. Security module 106 includes multiple components including monitoring component 108, privacy component 110, graphing component 112, training component 114, and tuning component 116.

Monitoring component 108 is configured to monitor and log the behavior of applications on endpoint devices 102. For example, monitoring component 108 may collect monitored data 104a from endpoint device 102a, monitored data 104b from endpoint device 102b, and monitored data 104c from endpoint device 102c. In particular, monitoring component 108 actively observes the activities of benign applications in each customer's network (e.g., in each endpoint device) using Endpoint Detection and Response (EDR) technology. This helps establish a baseline of normal behavior patterns.

The monitoring by monitoring component 108 happens at a low level (e.g., tracking kernel API calls or operating system calls). Due to using operating system level tracking, obfuscation and defense evasion becomes harder for attackers. Each important action is represented as a behavior event, which can be an interaction with the file system, a change in the registry, starting of a new process etc. Moreover, for each event, monitoring component 108 store metadata such as the process ID and timestamp. This metadata is later used for creation of the provenance graph.

The collection may be done through software (e.g., an agent) that is installed or built-in as part of the operating system of a given endpoint device. In some aspects, the collection may happen on virtual machines or on physical machines. In order to receive a diverse set of data, the collection may be done across multiple systems, from different users, companies, countries, industries, languages, and OS versions. Although only three endpoint devices are shown, one skilled in the art will appreciate that any number of endpoint devices may be monitored. In some aspects, the result generated by monitoring component 108 is a plurality of logs, which may include system logs, process logs, behavior logs, etc.

Privacy component 110 is configured to remove all user identities from the collected logs. For example, privacy component 110 may scan a log and remove personal identifiable information (PII), which may be used to identify a person. Examples of PII include, but are not limited to, name, date of birth, address, and government identifiers (e.g., social security number). In some aspects, privacy component 110 performs the removal of PII locally at a given endpoint device such that the PII does not leave the endpoint device.

Graphing component 112 may further create a provenance graph, which captures the relationship between different processes running at an endpoint device, using the plurality of logs. For example, for a given endpoint device, graphing component 112 may generate provenance graph 120. In FIG. 1, provenance graph 120a may be generated based on monitored data 104a, provenance graph 120b may be generated based on monitored data 104b, and provenance graph 120c may be generated based on monitored data 104c. A provenance graph gives an ordered relationship between the different events occurring on the endpoint device (e.g., which process created which files, which IP address was contacted, which process executed a downloaded file, which files were downloaded, etc.). These graphs capture valuable context for detecting anomalous activities.

On any given system, there can be a plethora of programs running in parallel. Graphing component 112 analyzes each running application separately. However, computer programs can create new threads, new processes, write and start new files, etc. In order to account for this, provenance graphs are created as they track all interactions that originate from a given program. As an example, a Microsoft Word™ application can start a Word™ macro, which again starts a PowerShell script, which in turn puts another application into the Windows™ Startup folder. All of those programs and files would then belong to one provenance graph and security module 106 analyzes all events in this graph. In practice, all programs on a given operating system are started by a common operating system process (e.g., for Windows: winlogon.exe). However, to avoid having all applications belong to the same graph, graphing component 112 defines a list of OS system applications that are not to be included in a graph as roots. As a result, all user applications are assigned to different graphs.

In some aspects, graphing component 112 considers multiple types of events or actions. These events include, but are not limited to:

Process start: a new application is executed.

File system access: a file or folder is modified, written, deleted, or read.

Network connections: any access to the Internet with protocols such as TCP and UDP Registry access (Windows™ system only): a registry key is written or read Memory access: a specific memory region is accessed, written to or access rights are modified User management: a new user account is created, credentials are modified, or configuration changed Training component 114 is configured to generate a training dataset by generating multiple sequences of events from each provenance graph generated. In some aspects, the sequences from one graph may have overlapping events. In some aspects, all events originate from a common provenance graph and are sorted by timestamp. The training dataset is then used by training component 114 to train global model 118. In some aspects, global model 118 may have a transformer-based architecture and is trained on provenance graphs from multiple customer networks. Global model 118 learns generalized representations of both benign and malicious behaviors applicable across various networks. These networks may be selected so that they have similar profile with that of the customer.

More specifically, training component 114 obtains events from all endpoint devices and trains global model 118 for malicious behavior classification. The events may be modeled as sequences or graphs. In some aspects, this training may happen on one or multiple central backend systems which receive the data from each individual client or whole organization. Global model 118 uses anonymized data and federated learning protocols to keep sensitive data within a client's network perimeter before it is sent.

For sequence classification, training component 114 transforms identifies a sequence of events in a provenance graph. For example, training component 114 may gather all recent events from one specific provenance graph, order them according to their timestamps, and create a linear sequence of events. In some aspects, each event may be represented by security-relevant features, and this data may be represented as a sequence of high dimensional vectors. This data format is suitable for a sequence classification machine learning model such as a transformer or a recurrent neural network (e.g., Long Short-Term Memory (LSTM) with attention).

In some aspects, the events may also be modeled as a graph, and used for training a graph neural network, which can subsequently be used to classify nodes, links, or graphs as malicious. The result of this step is global model 118 trained on global behavior data to predict maliciousness for a sequence of events. In a different embodiment, training component 114 may group the global data by sector, geographic location, operating system, or other criterium. This may generate a subset of the global model, which may be more relevant for a specific customer.

Tuning component 116 is configured to modify the parameters (e.g., learned weights) of global model 118 to generate tuned models 122. For example, tuning component 116 may tune global model 118 based on data specific to endpoint device 102a and thus generate tuned model 122a. Tuning component 116 may tune global model 118 based on data specific to endpoint device 102b and thus generate tuned model 122b. Tuning component 116 may tune global model 118 based on data specific to endpoint device 102c and thus generate tuned model 122c. The "data specific" to a particular endpoint device may include benign data from the endpoint device and malicious data collected from other endpoint devices. This ensures the model is optimized to detect threats specific to each customer's unique environment.

More specifically, for each endpoint device, security module 106 takes the global model 118 and fine-tunes it on the specific endpoint device's benign data and the global malicious data. This allows the model (e.g., tuned model 122a) to learning the benign behavior of the specific endpoint device, while also learning the malicious behaviors from across different endpoint devices. The fine-tuned model is deployed at the specific customer for predicting any malicious behavior at that customer. This reduces the risk of false positive detection significantly, as all benign applications are considered and used for the fine tuning. Each customer has a different set of legitimate applications and how they are used, making the endpoint device unique. The trained global base model, which includes malicious behavior across customers, allows the model to still detect unusual behavior of benign applications. This could, for example, be so called "living off the land" techniques, whereby legitimate system applications such as "Bitsadmin," are used to carry out malicious activity.

Subsequent to fine-tuning, the fine-tuned, customer-specific AI models (e.g., tuned models 122) are used to predict the likelihood of threats within the individual endpoint devices. By comparing the representations of original provenance graphs and ongoing activities, potential anomalies may be identified by security module 106. In terms of alerting and updating, if a predicted threat risk exceeds a predefined threshold, security module 106 generates an alert with relevant event information and enables swift response to potential threats. Information about suspicious events, including timestamps, is stored in a global database for future model retraining. This ensures that the global model 118 and each tuned model 122 is regularly updated to respond more effectively to emerging threats.

More specifically, at the inference stage, a tuned model produces a maliciousness probability for an input set of events (sequence or graph). If the probability of maliciousness is greater than a pre-defined threshold probability, security module 106 generates an alert indicating malicious activity, and provides the set of events with the alert. These set of events corresponding to malicious behavior are stored for continuous training of the AI models and sent back for future training. The output probabilities are also stored in a database, which is later analyzed as a time-series to detect a trend of increasing probability (of maliciousness) over time. Such a trend is detected using regression models (e.g., by fitting a linear model and checking if the slope is greater than a given threshold). If so, the system generates an alert, along with the most recent sequences of events, to provide context of malicious activities.

FIG. 2 is a diagram 200 illustrating the generation of a sequence of events 206 (used interchangeably with event sequence 206) from a log. Suppose that application AAA is a web browser that downloads/executes a malicious script CCC, which encrypts file DDD on an endpoint device. Log 202 may be specific to a particular process/application (e.g., application AAA) and may capture this behavior. Although logs may include several fields indicating various identifiers, dependencies, timestamps, statuses, etc., log 202 is presented in a basic manner for simplicity. As can be seen, log 202 may include several events. Depending on the complexity of the processes running and the level of detail captured, log 202 may include several thousand entries. Creating a sequence of events from a log alone does not produce effective training sequences because there may be several filler events between noteworthy events. For example, in log 202, the events related to various plugins and other events not shown but indicated by " . . . " may not be influential from a security perspective.

Furthermore, multiple logs may be needed to identify a sequence. Alignment of the logs is non-trivial as each log includes different information. For example, log 203 may be associated with the execution of application EEE, which may be an anti-virus scanning application. After scanning multiple files, applications, etc., application EEE may determine that script CCC is malicious, and may quarantine/remove the script.

Graphing component 112 may generate provenance graph 204 using the information from logs 202 and 203. For example, graphing component 112 may identify objects such as files, scripts, applications, processes, etc. These objects are visualized in FIG. 2 by circular identifiers. Each object may be connected to another object by an action. For example, application AAA is connected to script CCC and the link is labeled "executed by." Unlike logs 202 and 203, provenance graph 204 clearly highlights the relationships between the objects.

Training component 114 is configured to generate one or more sequence of events such as sequence 206 using both logs and the provenance graph. For example, training component 114 may identify certain events such as the quarantining event that indicates the presence of malicious activity on an endpoint device. Training component 114 may then identify, using the timestamps in the logs, and the links in provenance graphs, a list of events that contributed to the event(s) indicative of the presence of malicious activity. Referring to diagram 200, training component 114 may determine that the quarantined script CCC encrypted file BBB, and was executed by application AAA. Training component 114 may also determine that file BBB is normally read by application AAA. It is possible that without being able to read file BBB, application AAA may crash. In some aspects, training component 114 generates sequence 206 based on these relationships. In particular, any event that is directly related to an object (e.g., script CCC) associated with a trigger action (e.g., quarantining) is a candidate for inclusion in a sequence.

In some aspects, sequence 206 may be structured differently than the example shown in FIG. 2. For example, event types or actions such as "read," "execute," "encrypt," etc., may be mapped to quantitative values such as 1, 2, 3, respectively. Accordingly, whenever a source object applies an action on a target object, the sequence may simply include a timestamp of the action, an identifier of the source object, an action value, and an identifier of the target object in an event. For example, "Jan. 1, 2023 12:25 pm—File BBB read by Application AAA" may be simplified to "Jan. 1, 2023/12:25/BBB/1/AAA."

In one implementation, global model 118 specifically uses sequences of events in a time-window to learn application behavior. The sequences, as extracted from provenance graphs, connect different events, such as file creations, processes executions, registry modifications, network communications, etc. For example, during training, training component 114 may mask N amount of events in a sequence, and global model 118 may be trained to predict said masked events (e.g., predict the next event given a sequence of events). For example, given the first three events in sequence 206, global model 118 is trained to predict the last two events.

In another implementation, training component 114 is configured to analyze a provenance graph and detect a set of features that are relevant from a security perspective or may be associated with suspicious behavior. These features are trigger actions and include, but are not limited to:

A file gets downloaded and later executed (dropped binary)

Persistence is created via registry key

Persistence is created via startup folder

Sensitive data (e.g., web browser credentials, crypto wallet data, etc.) is accessed A PowerShell script is started with obfuscated or Base64-encoded parameters.

An executable is started from a temporary folder location

A DNS lookup is performed for a suspicious domain.

An upload greater than a threshold amount of data is performed

Global model 118 may be trained, using this training dataset of features, to predict a subset of masked features that define an event for one or more events in a sequence. Given an event sequence S, global model 118 may determine whether one of these features is identifiable and may determine whether the S is associated with malicious activity.

Security module 106 the following features:

Customization: Unlike traditional EDR solutions that rely on a one-size-fits-all detection and response mechanism, the systems and methods focus on creating tailored protection for each customer's unique network activity profile, by learning from local peculiarities.

Continual Adaptation: The systems and methods incorporate advanced AI algorithms and distributed machine learning systems, allowing the EDR solution to continuously analyze, learn, and adapt to novel and emerging threats tailored to the customer's specific network activity profile.

Cross-Customer Learning: The global model enables the sharing of insights across multiple customer networks, grouping may be per sector, country, region, OS, etc., which enhances the collective intelligence and overall effectiveness of the system. This collaborative learning feature, apart from one single global model, is not commonly found in existing EDR solutions.

Privacy-preserving learning: malicious or suspicious behavior patterns detected on client's side are aggregated and shared with the global behavior model through federated learning mechanism that doesn't share sensitive details of user's activities.

Real-time Processing: The ability to process live data from endpoint processes and incorporate real-time threat detection and response mechanisms sets the systems and methods apart from traditional EDR systems that may rely on periodic updates or predefined rules and signatures.

Dynamic Scaling: The distributed nature of the systems and methods allows for seamless scalability, accommodating an increasing number of customers or endpoints without significant impact on the system's performance.

Signature-based Detection: May be used as a baseline defense for known malware instances.

Heuristics: Implements heuristic techniques that involve analyzing the structure and behavior of applications to identify potentially malicious activities. This may serve as an additional layer of protection to reinforce the AI-driven approach of security module 106.

Sandboxing: Employs sandboxing techniques to isolate and observe applications in a controlled environment. By doing so, security module 106 may safely study the behavior of suspicious applications without risking the integrity of the primary network.

Integration with Threat Intelligence Platforms: Connects with external threat intelligence platforms, which can provide additional context about known and emerging threats, enabling a tuned model to gain insights from a larger pool of data.

Global behavior based detection models using the behavior across all customers to train a model can be paired with local whitelisting lists or local hardening solutions which prevent local applications from being accidently deleted.

Automated Incident Response: Integrates automated incident response capabilities to act upon identified threats immediately, allowing for faster resolution of security incidents and minimizing potential harm to the customer's network.

Collaboration with security vendors: Partners with other cybersecurity vendors to integrate their specialized tools, techniques, or threat intelligence data within security module 106. This collaboration may enhance a tuned model's learning capabilities and improve its overall effectiveness.

Seamless integration with Security Information and Event Management (SIEM) Solutions: Ensures compatibility with popular SIEM solutions to provide customers with comprehensive visibility into their security posture, enabling them to manage threats and vulnerabilities more effectively.

User Behavior Analytics: Includes user behavior analytics in the solution to detect anomalies in user activities, such as login patterns or access to sensitive resources, which may indicate a security breach or insider threat.

Security module 106 provides the following advantages over traditional security systems:

1. Tailored Protection: By considering the specific characteristics of each customer's network activity profile, the systems and methods enable better alignment of malware detection and response strategies to the unique cybersecurity needs of individual users or organizations. This helps reducing the risk of false positive detections.

2. Adaptability: The distributed machine learning system and advanced AI algorithms allow for continuous analysis and adaptation to potential threats. This improves the ability to proactively identify and neutralize novel and emerging cyber threats specific to customer's network activity profiles.

3. Collaborative Learning: The global model enables cross-customer learning from different but similar environments, which may help improve the collective intelligence of the system. As a result, the systems and methods not only benefit from localized fine-tuning at each customer endpoint but also from shared insights across multiple customers with similar network profile.

4. Real-time Threat Detection and Response: The systems and methods process live data from endpoint processes, enabling real-time identification, prediction, and mitigation of malware threats. This fast and responsive approach may minimize the time it takes to neutralize active threats, reducing the potential damage to customer networks.

5. Scalability: As a distributed system, the systems and methods accommodate an increasing number of customers or endpoints without significantly impacting system performance, making it a scalable EDR solution.

6. The data specific to the user's process/network activities is kept within client's network perimeter, while information on new malicious/suspicious patterns is shared with the global model through federated learning mechanisms.

These advantages, when combined, have the potential to significantly enhance overall EDR effectiveness and provide a more robust cybersecurity solution tailored to the distinct needs of each customer's network-resulting in higher detection rate and lower false positive rate.

FIG. 3 illustrates a flow diagram of method 300 for detecting malicious activity using a machine learning model tuned to a specific endpoint device. At 302, monitoring component 108 receives a plurality of logs (e.g., monitored data 104a, 104b, 104c, etc.) indicative of software behavior from a plurality of endpoint devices (e.g., endpoint devices 102a, 102b, 102c, etc.). For example, a local agent comprising monitoring component 108 on an endpoint device may monitor the software behavior and generate one or more logs for transmittal to monitoring component 108 on a remote server.

At 304, training component 114 generates a plurality of event sequences (e.g., such as sequence 206) from the plurality of logs. In particular, a subset of the plurality of event sequences comprises malicious events that occurred over the plurality of endpoint devices. While some of the event sequences may include benign events, some event sequences will need to include malicious events so that security module 106 can train a global model to distinguish malicious events from benign events. The method for generating the plurality of event sequences is further described in the description of FIG. 5.

The plurality of event sequences make up a training dataset, which may be limited in size for faster training times. For example, a user/developer of security module 106 may set a threshold amount of event sequences to be used for training global model 118. In some aspects, the threshold amount of event sequences may be set for each endpoint device (e.g., 100 sequences per endpoint device) or may be set for all endpoint devices (e.g., 1000 sequences for all endpoint devices).

At 306, training component 114 trains a global machine learning model (e.g., global model 118) using the plurality of event sequences to predict resultant events for a sequence of lead up events and classify whether the resultant events indicate malicious activity. For example, considering sequence 206, the lead up events may be the first three events and the resultant events may be the last two events. Global model 118 is trained to predict the last two events when given an input that includes the first three events. Global model 118 further determines whether the last two events are indicative of malicious activity.

In some aspects, each respective sequence of the plurality of event sequences includes a first plurality of lead up events and a second plurality of resultant events. Training the global machine learning model thus includes masking, for each respective sequence of the plurality of event sequences, the second plurality of resultant events, and adjusting parameters (e.g., weights) of the global machine learning model to output the second plurality of resultant events for an input comprising the first plurality of lead up events.

Steps 308-312 are performed for each respective endpoint device of the plurality of endpoint devices. At 308, tuning component 116 generates, using logs specific to the respective endpoint device from the plurality of logs, a testing dataset comprising a plurality of benign event sequences that occurred on the respective endpoint device. Prior to tuning, global model 118 may be efficient in detecting malicious activity, but may detect a high rate of false positives. This is because global model 118 is more likely to identify a sequence as malicious if it is not as familiar with the sequence (e.g., attributes/characteristics of the sequence). As mentioned before, every endpoint device has unique files, settings, processes, etc., that may not be found in the other endpoint devices used to train global model 118. The testing dataset attempts to capture this uniqueness and is used to tune global model 118 and, as a result, create several tuned models. For example, tuning component 116 may generate a first testing dataset for endpoint device 102a, a second testing dataset for endpoint device 102b, and a third testing dataset for endpoint device 102c. By re-training global model 118 on a particular testing dataset, security module 106 reduces the amount of false positives produced by the model when being executed on an endpoint device associated with the particular testing dataset. The testing dataset exposes the global model 118 to examples of benign event sequences so that such benign event sequences are not misclassified as malicious.

In some aspects, each benign event sequence of the plurality of benign event sequences comprises at least one object not found in the plurality of endpoint devices aside from the respective endpoint device. When generating the testing dataset, tuning component 116 generates a new set of event sequences that were not included in the plurality of event sequences (i.e., the training dataset). In particular, tuning component 116 may identify a particular object (e.g., an application, a file, a process, a thread, etc.) that is not found on the other endpoint devices that were monitored. Tuning component 116 may then identify event sequences that include the particular object and include those event sequences in the testing dataset.

Understandably, there may a limited number of objects that are unique to solely the endpoint device. In this case, tuning component 116 may identify object(s) that are present in less than a threshold amount of monitored endpoint devices (e.g., less than 50% of endpoint devices). Although two objects are shared across two or more endpoint devices, their usage may be different. Accordingly, the sequences may not be identical.

In some aspects, generating the testing dataset involves including, in the testing dataset, a plurality of malicious event sequences originating from the plurality of endpoint devices aside from the respective endpoint device. For example, tuning component 116 may include additional examples in the testing dataset that were not previously found in the training dataset. This improves the accuracy of the tuned model to detect malicious activity while reducing the amount of potential false positives. It should be noted that a true malicious event (e.g., a malicious script encrypting a file) will negative affect all endpoint devices. Accordingly, these types of malicious events will be included in both the training dataset and the testing dataset. However, a benign event misclassified as a malicious event may be misclassified due to its uniqueness to an endpoint device. Accordingly, these types of benign events are generally needed for tuning via the testing dataset.

In some aspects, retraining the global machine learning model involves applying a boosting algorithm (e.g., Adaboost) on one or both of the plurality of benign event sequences and the plurality of malicious event sequences. Boosting enables the tuned machine learning model to focus on a particular type of data. This data may include malicious events (which may be limited in number) or events with object(s) found only on an endpoint device (which may also be limited in number). Because both type of events may be limited in number, boosting allows tuning to be more effective.

At 310, tuning component 116 generates a tuned machine learning model for the respective endpoint device by retraining the global machine learning model using the testing dataset. For example, tuning component 116 may generate tuned model 122a for endpoint device 102a, tuned model 122b for endpoint device 102b, and tuned model 122c for endpoint device 102c. Each of these models will have different parameters from each other due to the natural uniqueness of each endpoint device.

At 312, security module 106 executes the tuned machine learning model on the respective endpoint device to detect malicious activity. For example, security module 106 may execute tuned model 122a on endpoint device 102a, tuned model 122b on endpoint device 102b, and tuned model 122c on endpoint device 102c. In some aspects, security module 106 may detect malicious activity by applying the tuned machine learning model on an input sequence of events (e.g., comprising a malicious event) of the respective endpoint device.

Figure 4:
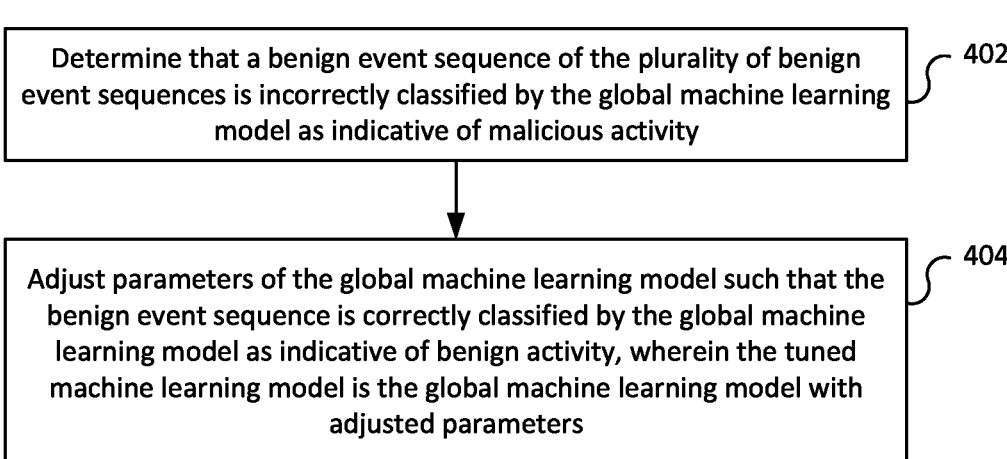
FIG. 4 illustrates a flow diagram of a method for tuning a global machine learning model.

FIG. 4 illustrates a flow diagram of method 400 for tuning a global machine learning model. At 402, tuning component 116 determines that a benign event sequence of the plurality of benign event sequences is incorrectly classified by the global machine learning model as indicative of malicious activity. For example, the benign event sequence in the testing dataset may be labelled as "benign," but may be misclassified by the global machine learning model as "malicious." In response, at 404, tuning component 116 adjusts parameters of the global machine learning model such that the benign event sequence is correctly classified by the global machine learning model as indicative of benign activity. In this case, the tuned machine learning model is the global machine learning model with adjusted parameters. Adjusting parameters may involve adjusting the weights in the vector(s) that the machine learning model applies on an input sequence that ultimately classifies whether the sequence is malicious. These vectors may be distributed throughout multiple layers if the machine learning model is a neural network.

Figure 5:
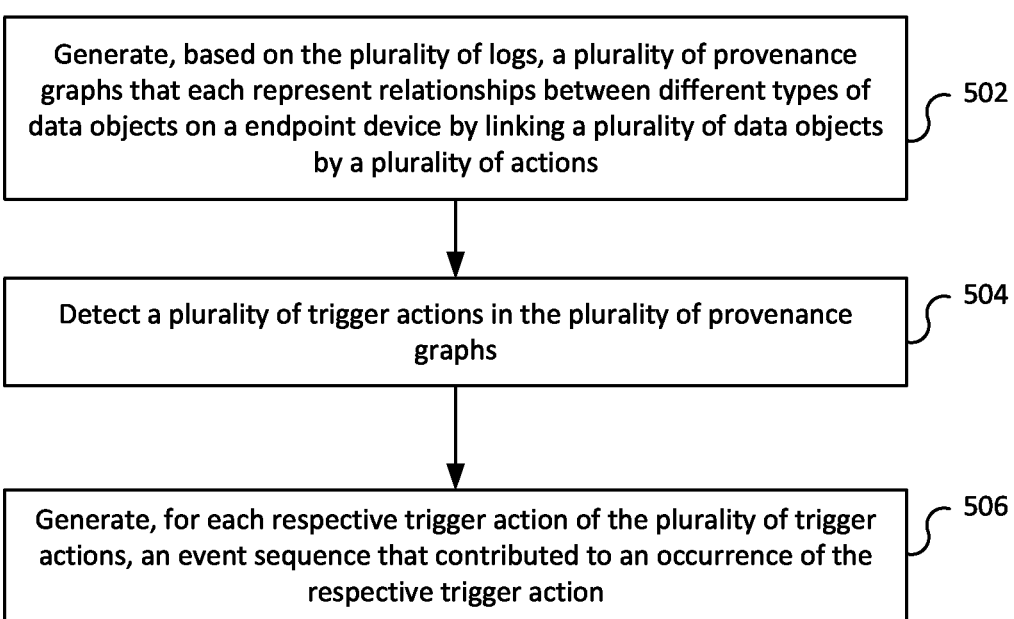
FIG. 5 illustrates a flow diagram of a method for generating a plurality of event sequences.

FIG. 5 illustrates a flow diagram of method 500 for generating a plurality of event sequences. At 502, graphing component 112 generates, based on the plurality of logs, a plurality of provenance graphs (e.g., provenance graphs 120a, 120b, 120c, etc.) that each represent relationships between different types of data objects on an endpoint device by linking a plurality of data objects by a plurality of actions.

In some aspects, generating a respective provenance graph of the plurality of provenance graphs comprises identifying, in a first log, a source object, an action performed by the source object, and a target object on which the action was performed. Based on this, graphing component 112 links, on the respective provenance graph, a first identifier of the source object, a second identifier of the action, and a third identifier of the target object.

At 504, graphing component 112 detects a plurality of trigger actions in the plurality of provenance graphs. At 506, graphing component 112 generates, for each respective trigger action of the plurality of trigger actions, an event sequence that contributed to an occurrence of the respective trigger action.

Figure 6:
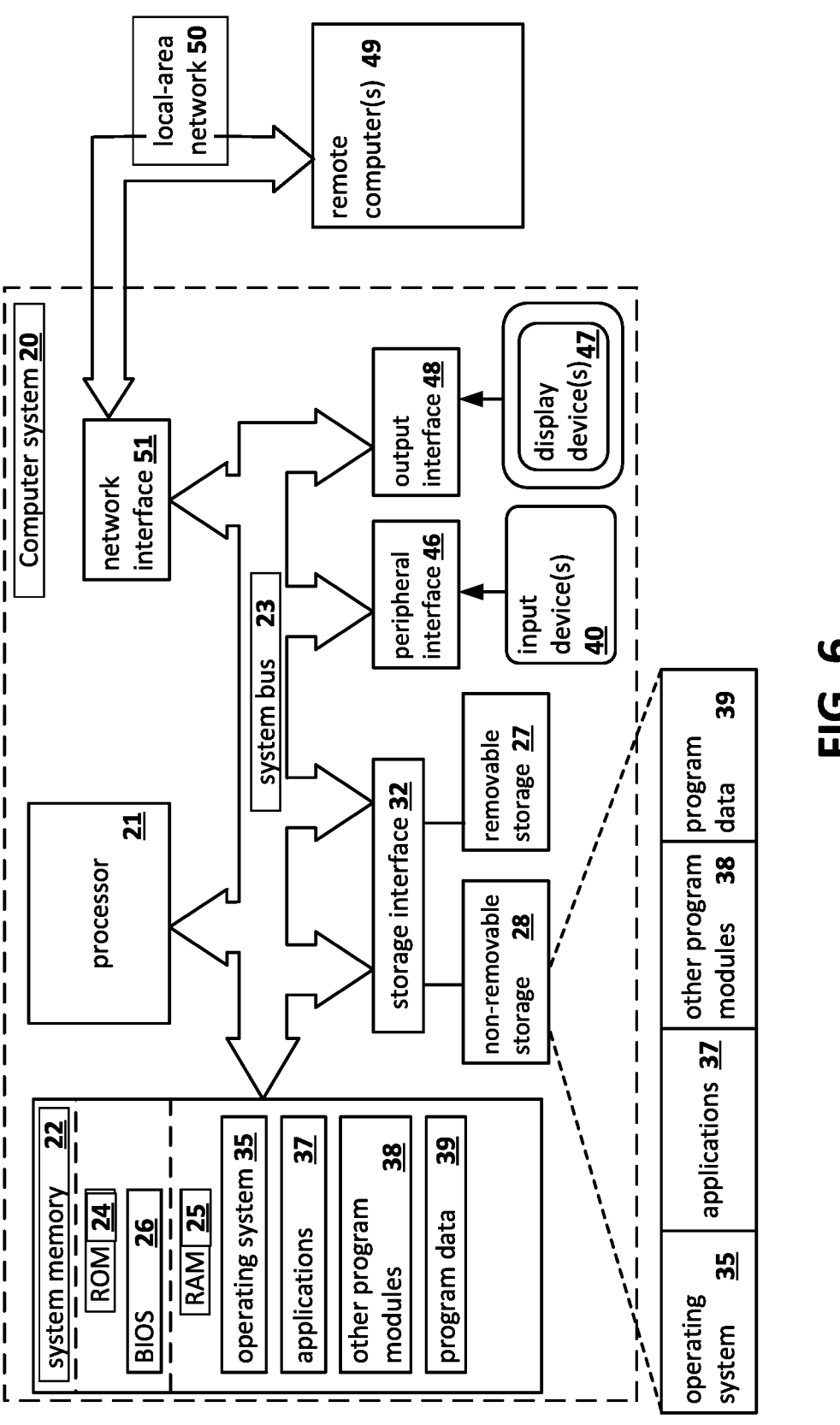
FIG. 6 presents an example of a general-purpose computer system on which aspects of the present disclosure can be implemented.

FIG. 6 is a block diagram illustrating a computer system 20 on which aspects of systems and methods for detecting malicious activity using a machine learning model tuned to a specific endpoint device may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious activity using a tuned machine learning model, the method comprising:

receiving a plurality of logs indicative of software behavior from a plurality of endpoint devices;

generating a plurality of event sequences from the plurality of logs, wherein a subset of the plurality of event sequences comprises malicious events that occurred over the plurality of endpoint devices, wherein each respective sequence of the plurality of event sequences comprises a first plurality of lead up events and a second plurality of resultant events;

training a global machine learning model using the plurality of event sequences to predict the second plurality of resultant events based on the first plurality of lead up events and classify whether the resultant events indicate malicious activity, wherein training the global machine learning model comprises: masking, for each respective sequence of the plurality of event sequences, the second plurality of resultant events; and adjusting parameters of the global machine learning model to output the second plurality of resultant events for an input comprising the first plurality of lead up events; and for each respective endpoint device of the plurality of endpoint devices:

generating, using logs specific to the respective endpoint device from the plurality of logs, a testing dataset comprising a plurality of benign event sequences that occurred on the respective endpoint device;

generating a tuned machine learning model for the respective endpoint device by retraining the global machine learning model using the testing dataset; and executing the tuned machine learning model on the respective endpoint device to detect malicious activity.

2. The method of claim 1, wherein retraining the global machine learning model comprises:

determining that a benign event sequence of the plurality of benign event sequences is incorrectly classified by the global machine learning model as indicative of malicious activity; and adjusting parameters of the global machine learning model such that the benign event sequence is correctly classified by the global machine learning model as indicative of benign activity, wherein the tuned machine learning model is the global machine learning model with adjusted parameters.

3. The method of claim 1, wherein generating the testing dataset comprises including, in the testing dataset, a plurality of malicious event sequences originating from the plurality of endpoint devices aside from the respective endpoint device.

4. The method of claim 3, wherein generating the testing dataset comprises applying a boosting algorithm on one or both of the plurality of benign event sequences and the plurality of malicious event sequences.

5. The method of claim 1, wherein each benign event sequence of the plurality of benign event sequences comprises at least one object not found in the plurality of endpoint devices aside from the respective endpoint device.

6. The method of claim 1, further comprising detecting the malicious activity by applying the tuned machine learning model on an input sequence of events of the respective endpoint device.

7. The method of claim 1, wherein a first tuned machine learning model for a first endpoint device of the plurality of endpoint devices has different parameters than a second tuned machine learning model for a second endpoint device of the plurality of endpoint devices.

8. The method of claim 1, wherein generating the plurality of event sequences comprises:

generating, based on the plurality of logs, a plurality of provenance graphs that each represent relationships between different types of data objects on an endpoint device by linking a plurality of data objects by a plurality of actions;

detecting a plurality of trigger actions in the plurality of provenance graphs; and generating, for each respective trigger action of the plurality of trigger actions, an event sequence that contributed to an occurrence of the respective trigger action.

9. The method of claim 8, wherein generating a respective provenance graph of the plurality of provenance graphs comprises:

identifying, in a first log, a source object, an action performed by the source object, and a target object on which the action was performed; and linking, on the respective provenance graph, a first identifier of the source object, a second identifier of the action, and a third identifier of the target object.

10. A system for detecting malicious activity using a tuned machine learning model, comprising:

at least one memory; and at least one hardware processor coupled with the at least one memory and configured, individually or in combination, to:

receive a plurality of logs indicative of software behavior from a plurality of endpoint devices;

generate a plurality of event sequences from the plurality of logs, wherein a subset of the plurality of event sequences comprises malicious events that occurred over the plurality of endpoint devices, wherein each respective sequence of the plurality of event sequences comprises a first plurality of lead up events and a second plurality of resultant events;

train a global machine learning model using the plurality of event sequences to predict the second plurality of resultant events based on the first plurality of lead up events and classify whether the resultant events indicate malicious activity, wherein training the global machine learning model comprises: masking, for each respective sequence of the plurality of event sequences, the second plurality of resultant events; and adjusting parameters of the global machine learning model to output the second plurality of resultant events for an input comprising the first plurality of lead up events; and for each respective endpoint device of the plurality of endpoint devices:

generate, using logs specific to the respective endpoint device from the plurality of logs, a testing dataset comprising a plurality of benign event sequences that occurred on the respective endpoint device;

generate a tuned machine learning model for the respective endpoint device by retraining the global machine learning model using the testing dataset; and execute the tuned machine learning model on the respective endpoint device to detect malicious activity.

11. The system of claim 10, wherein the at least one hardware processor is configured to retrain the global machine learning model by:

determining that a benign event sequence of the plurality of benign event sequences is incorrectly classified by the global machine learning model as indicative of malicious activity; and adjusting parameters of the global machine learning model such that the benign event sequence is correctly classified by the global machine learning model as indicative of benign activity, wherein the tuned machine learning model is the global machine learning model with adjusted parameters.

12. The system of claim 10, wherein the at least one hardware processor is configured to generate the testing dataset by including, in the testing dataset, a plurality of malicious event sequences originating from the plurality of endpoint devices aside from the respective endpoint device.

13. The system of claim 12, wherein the at least one hardware processor is configured to generate the testing dataset by applying a boosting algorithm on one or both of the plurality of benign event sequences and the plurality of malicious event sequences.

14. The system of claim 10, wherein each benign event sequence of the plurality of benign event sequences comprises at least one object not found in the plurality of endpoint devices aside from the respective endpoint device.

15. The system of claim 10, wherein the at least one hardware processor is configured to detect the malicious activity by applying the tuned machine learning model on an input sequence of events of the respective endpoint device.

16. The system of claim 10, wherein a first tuned machine learning model for a first endpoint device of the plurality of endpoint devices has different parameters than a second tuned machine learning model for a second endpoint device of the plurality of endpoint devices.

17. The system of claim 10, wherein the at least one hardware processor is configured to generate the plurality of event sequences by:

generating, based on the plurality of logs, a plurality of provenance graphs that each represent relationships between different types of data objects on an endpoint device by linking a plurality of data objects by a plurality of actions;

detecting a plurality of trigger actions in the plurality of provenance graphs; and generating, for each respective trigger action of the plurality of trigger actions, an event sequence that contributed to an occurrence of the respective trigger action.

18. The system of claim 17, wherein the at least one hardware processor is configured to generate a respective provenance graph of the plurality of provenance graphs by:

identifying, in a first log, a source object, an action performed by the source object, and a target object on which the action was performed; and linking, on the respective provenance graph, a first identifier of the source object, a second identifier of the action, and a third identifier of the target object.

19. A non-transitory computer readable medium storing thereon computer executable instructions for detecting malicious activity using a tuned machine learning model, including instructions for:

receiving a plurality of logs indicative of software behavior from a plurality of endpoint devices;

generating a plurality of event sequences from the plurality of logs, wherein a subset of the plurality of event sequences comprises malicious events that occurred over the plurality of endpoint devices, wherein each respective sequence of the plurality of event sequences comprises a first plurality of lead up events and a second plurality of resultant events;

training a global machine learning model using the plurality of event sequences to predict the second plurality of resultant events based on the first plurality of lead up events and classify whether the resultant events indicate malicious activity, wherein training the global machine learning model comprises: masking for each respective sequence of the plurality of event sequences, the second plurality of resultant events; and adjusting parameters of the global machine learning model to output the second plurality of resultant events for an input comprising the first plurality of lead up events; and for each respective endpoint device of the plurality of endpoint devices:

generating, using logs specific to the respective endpoint device from the plurality of logs, a testing dataset comprising a plurality of benign event sequences that occurred on the respective endpoint device;

generating a tuned machine learning model for the respective endpoint device by retraining the global machine learning model using the testing dataset; and executing the tuned machine learning model on the respective endpoint device to detect malicious activity.

\* \* \* \* \*